United States Patent
Schorr et al.

(10) Patent No.: US 8,323,562 B2
(45) Date of Patent: Dec. 4, 2012

(54) VACUUM PACKAGED PRODUCTS AND METHODS FOR MAKING SAME

(75) Inventors: Phillip Andrew Schorr, Atlanta, GA (US); Aaron Drake Smith, Roswell, GA (US); Sean Gorman, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/239,522

(22) Filed: Sep. 22, 2011

(65) Prior Publication Data

US 2012/0012496 A1     Jan. 19, 2012

Related U.S. Application Data

(63) Continuation of application No. 12/126,279, filed on May 23, 2008, now abandoned.

(51) Int. Cl.
| | |
|---|---|
| *A61L 2/00* | (2006.01) |
| *G01N 21/00* | (2006.01) |
| *B29D 22/00* | (2006.01) |
| *B65B 31/00* | (2006.01) |
| *B65B 55/02* | (2006.01) |

(52) U.S. Cl. ........... 422/22; 422/1; 422/24; 422/186.05; 250/453.11; 250/455.11; 250/492.1; 53/425; 53/408; 53/432

(58) Field of Classification Search ............... 422/1, 22, 422/24, 186.05; 250/453.11, 455.11, 492.1; 53/408, 425, 432; 428/35.7, 36.6
See application file for complete search history.

(56) References Cited

U.S. PATENT DOCUMENTS

| | | | |
|---|---|---|---|
| 3,940,325 | A | 2/1976 | Hirao |
| 4,041,203 | A | 8/1977 | Brock et al. |
| 4,097,236 | A | 6/1978 | Daly et al. |
| 4,214,320 | A | 7/1980 | Belkin |
| 4,340,563 | A | 7/1982 | Appel et al. |
| 5,041,483 | A | 8/1991 | Burch |
| 5,155,197 | A | 10/1992 | Austin et al. |
| 5,217,307 | A | 6/1993 | McClintock |
| 5,371,124 | A | 12/1994 | Cooke |
| 5,392,590 | A * | 2/1995 | Ambrose et al. ............... 53/425 |
| 5,414,049 | A | 5/1995 | Sun et al. |
| 5,484,645 | A | 1/1996 | Lickfield et al. |
| 5,485,496 | A | 1/1996 | Lee et al. |
| 5,559,167 | A | 9/1996 | Mahood |
| 5,616,408 | A | 4/1997 | Oleszczuk et al. |
| 5,683,795 | A | 11/1997 | Ambrose et al. |

(Continued)

FOREIGN PATENT DOCUMENTS

| | | |
|---|---|---|
| WO | WO 01/09425 | 2/2001 |

(Continued)

OTHER PUBLICATIONS

ASTM Designation: D 5034-95, "Standard Test Method for Breaking Strength and Elongation of Textile Fabrics (Grab Test)", Published Jul. 1995, pp. 674-681.

*Primary Examiner* — Jill Warden
*Assistant Examiner* — Monzer Chorbaji
(74) *Attorney, Agent, or Firm* — Nancy M. Klembus; Ralph H. Dran

(57) ABSTRACT

A vacuum packaged product and method for reducing tensile strength loss associated with sterilization of polyolefin-based products by gamma radiation, and reducing odors commonly produced by such sterilization.

15 Claims, 1 Drawing Sheet

U.S. PATENT DOCUMENTS

| | | |
|---|---|---|
| 5,727,684 A | 3/1998 | Webb et al. |
| 5,770,287 A | 6/1998 | Miranda et al. |
| 5,780,098 A | 7/1998 | Battles |
| 5,804,620 A | 9/1998 | Amos |
| 5,881,534 A | 3/1999 | Ahlqvist et al. |
| 5,994,436 A | 11/1999 | Pierson |
| 6,073,767 A | 6/2000 | Cohen et al. |
| 6,218,189 B1 | 4/2001 | Antonoplos et al. |
| 6,231,936 B1 | 5/2001 | Kozimor et al. |
| 6,599,598 B1 | 7/2003 | Tai et al. |
| 6,715,263 B2 | 4/2004 | Banks |
| 6,831,025 B2 | 12/2004 | Rudisill et al. |
| 7,026,417 B2 | 4/2006 | Yang et al. |
| 7,273,594 B2 | 9/2007 | Lin et al. |
| 2002/0142168 A1 | 10/2002 | Speer et al. |
| 2004/0062692 A1 | 4/2004 | Lin et al. |
| 2004/0129554 A1 | 7/2004 | Solis et al. |
| 2005/0019208 A1 | 1/2005 | Speer et al. |
| 2005/0194391 A1 | 9/2005 | Domke et al. |
| 2005/0249899 A1 | 11/2005 | Bonutti |
| 2006/0016156 A1 | 1/2006 | Bush et al. |
| 2006/0134728 A1 | 6/2006 | MacDonald et al. |
| 2006/0243625 A1 | 11/2006 | Biddick et al. |
| 2007/0157564 A1 | 7/2007 | Vander Bush et al. |

FOREIGN PATENT DOCUMENTS

| | | |
|---|---|---|
| WO | WO 02/059001 | 8/2002 |
| WO | WO 2007/012848 | 2/2007 |

\* cited by examiner

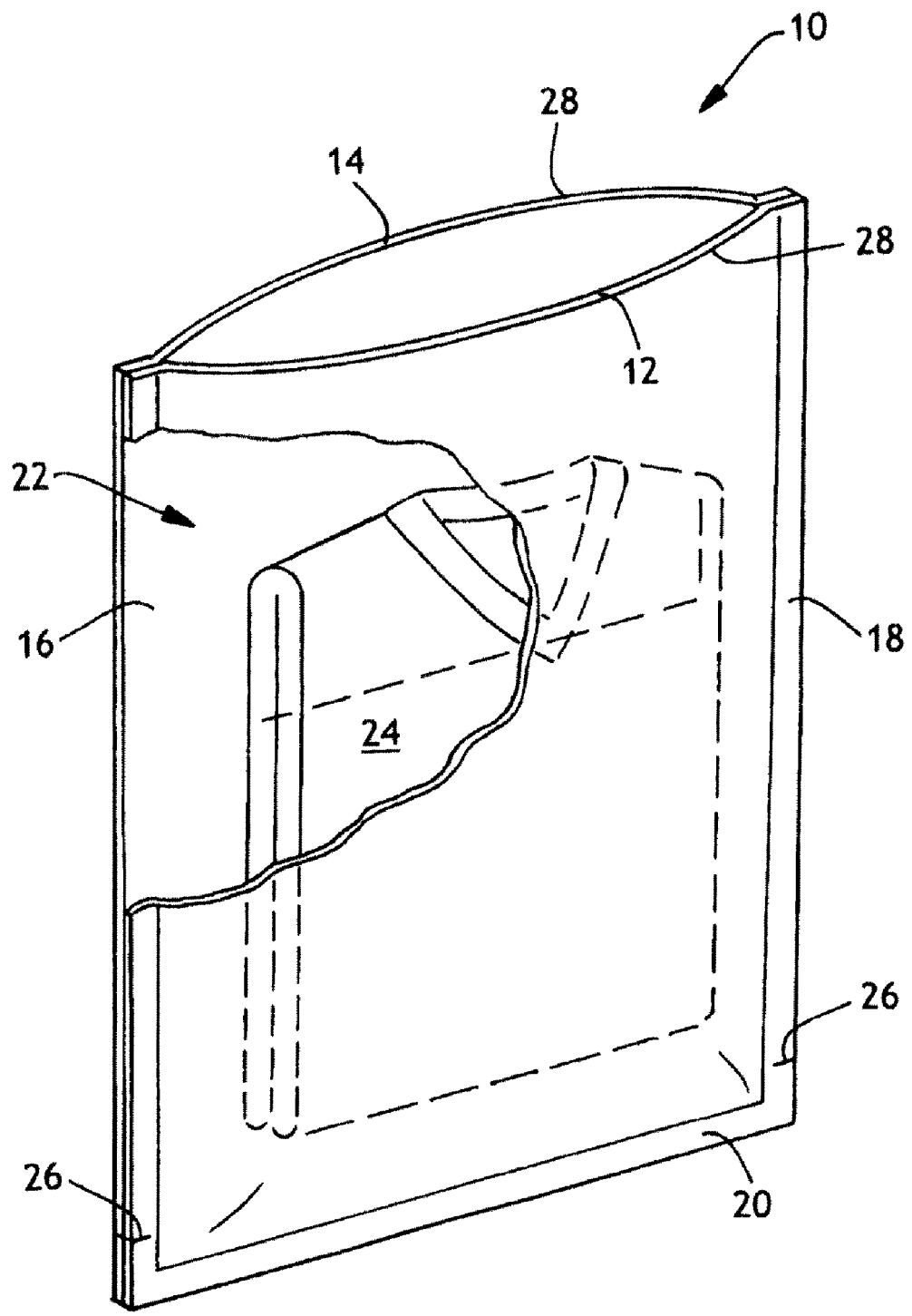

VACUUM PACKAGED PRODUCTS AND METHODS FOR MAKING SAME

This application claims priority to and is a continuation of application Ser. No. 12/126,279, filed on May 23, 2008, now abandoned.

FIELD OF THE INVENTION

The invention pertains to vacuum packaged products and methods of making the same, and more particularly to vacuum packaged polyolefin-based products and methods that reduce or eliminate the undesirable side effects associated with the gamma irradiation thereof.

BACKGROUND OF THE INVENTION

Various fields of use require the use of sterilized polyolefin-based clothing, equipment and tools. For example, it is well known that the operating environments of medical personnel, dental personnel, chemical research personnel, biotech personnel, and other like areas utilize polyolefin-based products that have been sterilized prior to use.

Currently, ethylene oxide has been used to sterilize polyolefin-based products such as medical fabrics that are used as surgical gowns and drapes. However, the potentially hazardous nature and high cost of ethylene oxide sterilization have caused the medical community to consider different sterilization methods. One effective method of sterilization has been the use of gamma irradiation. Although sterilization by gamma irradiation of polyolefin-based products and equipment has been successful, there remain at least two very undesirable side effects caused by the irradiation process. The first undesirable side effect has been a resulting odor that is so extreme that it renders the gamma irradiated polyolefin-based product undesirable for many uses. The second undesirable side effect has been a noticeably decreased strength of the irradiated polyolefin-based products. In fact, the irradiation process has been known to decrease a polyolefin-based product's tear strength by as much as 65% of its non-irradiated tear strength.

It has been shown that the cause for the undesirable odor and the loss in polyolefin-based product strength is a free radical process that occurs when the polyolefins of the product are exposed to gamma radiation in the presence of oxygen. In polyolefin-based products, this process essentially breaks chemical bonds that hold a polyolefin chain together and creates free radicals. This breaking of the polyolefin backbone causes the polyolefin to lose strength proportional to the radiation dosage. The formed radicals are able to recombine with the oxygen in the air, producing short chain acids, oxygenated compounds, such that they become trapped in the product. Butyric acid, one of the acids formed, is a primary suspect in causing the odor.

Although earlier efforts and attempts to eliminate these two undesirable side effects include methods that marginally reduce the odor associated with the gamma irradiation of polyolefin-based products, none has adequately reduced the odor or minimized the reduction in tear strength resulting from the irradiation treatment.

A need therefore exists for a product and method for further minimizing or eliminating the odor that is associated with the gamma irradiation of polyolefin-based products.

Another need exists for a product and method that not only reduces the odor, but also minimizes any decrease in the strength of the polyolefin-based product that is due to the gamma irradiation.

SUMMARY OF THE INVENTION

In one embodiment of the present invention there is provided a product vacuum packaged in a package to reduce tensile strength loss of the product after sterilization by radiation in which the package comprises a layer having an oxygen transmission rate equal to or less than about 0.2 cubic centimeter of oxygen per 100 inches squared per 24 hours and an interior. The product is in the interior of the package, and the interior has a vacuum therein at a pressure equal to or less than about 100 millibars. The package and the product are sterilized by radiation resulting in the product having a reduction in its tensile strength less than about 20% after radiation.

In another embodiment of the present invention there is provided a product vacuum packaged in a package to reduce tensile strength loss of the product after sterilization by radiation in which the package comprises an ethylene vinyl alcohol layer having an oxygen transmission rate equal to or less than about 0.2 cubic centimeter of oxygen per 100 inches squared per 24 hours and an interior. The product is in the interior of the package and comprises a nonwoven polypropylene material, and the interior of the package has a vacuum therein at a pressure equal to or less than about 10 millibars. The package and the product are sterilized by radiation resulting in the product having a reduction in its tensile strength of less than about 14% after radiation.

In yet another embodiment of the present invention there is provided a product vacuum packaged in a package to reduce tensile strength loss of the product after sterilization by radiation in which the package comprises a layer having an oxygen transmission rate equal to or less than about 2.3 cubic centimeter of oxygen per 100 inches squared per 24 hours and an interior. The product is in the interior of the package, and the interior of the package has a vacuum therein at a pressure equal to or less than about 10 millibars. The package and the product are sterilized by radiation resulting in the product having a reduction in its tensile strength less than about 17% after radiation.

In still another embodiment of the present invention there is provided a method of packaging a product in a package to reduce tensile strength loss of the product after sterilization by radiation comprising the steps of providing the package comprising a layer having an oxygen transmission rate equal to or less than about 0.2 cubic centimeter of oxygen per 100 inches squared per 24 hours and an interior; providing the product in the interior of the package; creating a vacuum in the package containing the product to a pressure equal to or less than about 10 millibars, and thereafter sterilizing the package and product with radiation resulting in the product having a reduction in its tensile strength less than about 14%.

BRIEF DESCRIPTION OF THE DRAWING

The above-mentioned and other features of the present invention and the manner of attaining them will become more apparent, and the invention itself will be better understood by reference to the following description of the invention, taken in conjunction with the accompanying drawing, wherein:

FIG. 1 illustrates a partially broken-away view of one embodiment of the present invention.

DESCRIPTION OF A PREFERRED EMBODIMENT

It is known that when a product is irradiated, some of the bonds in the polyolefin chains are broken and combine with available oxygen, which leads to more chain scission, thereby weakening the product. With the present method, the product is irradiated, causing the breakage of some of the polyolefin chains, but there is little or no oxygen to combine with the bonding sites in the broken polyolefin chains. The available bonding sites in the polyolefin chains are therefore free to recombine with one another instead of with oxygen in the package such that the majority of the strength of the irradiated product is maintained. The minimization of the potential for the formation of oxygenated compounds, such as short-chain organic acids, with consequent reduction or elimination of odors associated therewith also comprises a feature of the present invention, as do products which exhibit such characteristics.

The present invention pertains to a polyolefin-based product, such as a nonwoven material. A nonwoven material is formed without the aid of a textile weaving or knitting process such that it has a structure of individual fibers or threads that are interlaid, but not in any identifiable, repeating pattern. Nonwoven materials have been, in the past, formed by a variety of processes such as, for example, meltblowing processes, spunbonding processes, and bonded carded web processes. The materials of the present invention are generally selected from the polyolefin family. More specifically, the polyolefins may either be homopolymers or copolymers. The preferred homopolymer is polypropylene, and the preferred copolymer is a propylene/ethylene copolymer. The amount of propylene in the copolymer may range from 90% to 100%, and the amount of ethylene in the copolymer may range from 0 to 10%. It should be appreciated that as the amount of ethylene is increased, the flexibility of the material being produced will also be increased. Therefore, the preferred copolymer is 97% propylene and 3% ethylene.

Methods for making polyolefin-based fabrics are well known in the art, see for example U.S. Pat. Nos. 4,041,203 and 4,340,563, which are incorporated by reference herein.

The weight of the produced material for use in the product, represented in ounces per square yard, is normally determined by the intended use thereof. For example, if the material is to be used as a vehicle cover, the weight of the material should generally be in the range of 7.20 ounces per square yard (osy). If the material is to be used as a diaper liner, the weight of the material should generally be in the range from 0.3 ounces per square yard to 0.8 ounces per square yard. For surgical gowns, the material weight should range from 0.8 ounces per square yard to 3.0 ounces per square yard. A preferred polyolefin-based material for the product of the present invention is a nonwoven polypropylene spunbond/meltblown/spunbond (SMS) material having a basis weight of about 128 osy; another preferred basis weight is about 1.8 osy.

A gamma stabilizer, such as a benzoate ester, may be incorporated into the polyolefin prior to polyolefin extrusion. In the past, it has generally been believed that a gamma stabilizer must be added to the polyolefin in order to stabilize the polyolefin for the gamma irradiation process. This step was taken in an effort to minimize polyolefin strength loss and decrease odors. However, it is known that the use of a gamma stabilizer is not necessary in order to minimize polyolefin strength loss and odor. The present invention has been found to minimize strength loss in polypropylene without a gamma stabilizer. Also, it has been determined that the gamma stabilizer is not needed to reduce the odor associated with the gamma irradiation process. Nevertheless, a gamma stabilizer suitable for intended use herein and known to those of ordinary skill in the art may be incorporated into the polyolefin prior to extrusion.

After the polyolefin-based product to be sterilized has been obtained, it is normally placed in an oxygen impermeable package. By "oxygen impermeable" it is meant that the material of construction exhibits a high barrier to oxygen transmission, as will be further discussed hereafter. Once the product has been placed within the package, i.e. the polyolefin product or fabric with or without a gamma stabilizer, the package is sealed by conventional means and then sterilized by gamma radiation. Methods for heat sealing oxygen impermeable packages are well known in the art.

Gamma irradiation techniques are also well-known in the art. For a general description of the gamma irradiation of polyolefin fibers see U.S. Pat. No. 5,041,483, which is herein incorporated by reference. Generally speaking, the amount of radiation necessary to sterilize the polyolefin product or gown is dependent upon the bioburden of the product. Additional factors include the density and configuration of the product to be sterilized. A likely range of irradiation is from about 10 kilogray to about 100 kilogray, more preferably from about 15 kilogray to about 60 kilogray.

In one aspect of the present invention, the product and package to be sterilized includes a product made of a nonwoven polypropylene material packaged in a package comprising an ethylene vinyl alcohol layer. Preferably, the package comprises a 3-layer co-extruded film comprising an outermost layer of nylon, an innermost layer of polyethylene, and an intermediate layer of ethylene vinyl alcohol (EVOH). The EVOH layer preferably has an oxygen transmission rate (OTR) of about 0.2 cubic centimeters of oxygen per 100 inches squared per 24 hours. Prior to sterilization, the package has a vacuum created therein at about 10 millibars.

The materials and methods used in carrying out the present invention may be more fully understood by reference to the following examples, which examples are not intended in any manner to limit the scope of the present invention.

Description of Samples:

Materials

Nonwoven materials: All nonwoven materials used in this study were thermally-bonded polypropylene spunbond fabrics that have a basis weight of 1.2 ounces per square yard.

Materials 1A and 1B are comprised of Exxon Mobil type 3155 polypropylene resin and 1 wt % titanium dioxide (TiO2).

Materials 2A and 2B are comprised of Exxon Mobil type 3155 polypropylene resin, 1 wt % TiO2, 1 wt % Chimassorb 2020, and 0.2 wt % Tinuvin 770. Chimassorb 2020 [CAS #192268-64-7] and Tinuvin 770 [CAS #52829-07-9] are commercially-available hindered amine chemistries from Ciba Specialty Chemicals.

The "A" and "B" denote different lots of the same material made on different dates using similar process settings.

Prior to packaging, the rolls of spunbond material were converted into fabric bundles consisting of 100 individual sheets each 7.5" wide by 9.5" long. This corresponds to a total fabric area of roughly 5.5 square yards per bundle (~0.4 pounds).

Packaging materials: Packaging materials with various oxygen transmission rates (OTR) were used in the examples to illustrate the invention. The individual packages were formed by thermally forming and sealing two different layer materials together. The materials used are shown below.

| Manufacturer | Top Film Bottom (Forming) Film | Resulting Package OTR (cm³/100 in²/day) |
|---|---|---|
| Sealed Air Corporation | Cryovac ® T-7230BW Cryovac ® T-7040EZ | 0.2 |
| Amcor Limited | LCP-162 NXC-040 | 2.3 |
| Rollprint Packaging Products | ClearForm ® Allegro ® | >75** |

Packing process: Individual packages of material were created using a form-fill-seal process by thermally forming the bottom layer into a cavity (10"×8"×1.5"), placing a single bundle of spunbond into the cavity, pressing the top layer onto the bottom layer, pulling the desired level of vacuum, and thermally sealing the top layer to the bottom layer. The vacuum level reported is the amount of pressure remaining in the package when it was sealed. Sixty-four individual packages were created for all examples and comparative examples. Thirty-two of these packages were tested for tensile strength immediately, while the other thirty-two were dosed with 50 kGy of radiation prior to tensile testing.

Radiation dosing. Packages were exposed to either gamma or electron beam radiation. Gamma irradiation was done for tight control (+/−10%) of the radiation dose. Electron beam irradiation was performed by passing individual packages instead of cases of product under the electron beam. This provided a much more controlled and reproducible radiation dose to the spunbond materials. In both cases, a target dose of 50 kGy was used in the examples illustrated below. For the manufacturing process used to generate these samples, 50 kGy is considered the worst case radiation exposure necessary to ensure a $10^{-6}$ sterility assurance level and was therefore chosen to illustrate the invention. Previous work has demonstrated a strong correlation between the radiation dose applied to polypropylene spunbond samples and the amount of tensile loss that occurs. It should be apparent to those skilled in the art that controlling the bioburden of the nonwoven fabric may allow for a lower dose of radiation to ensure the same sterility assurance level.

Tensile Testing: For all examples and comparative examples, tensile testing was conducted following ASTM D-5034 test method entitled: "Standard Test Method for Breaking Strength and Elongation of Textile Fabrics (Grab Test)". Details of the testing method can be found below.

| | |
|---|---|
| Sample Size | 6" long × 4" wide |
| Crosshead Speed | 12 inches/minute |
| Gage Length | 3 inches |
| Load Units | Pound-force |
| Full-Scale Load | Use an appropriate load cell for the material being tested so that the test value falls between 10 and 90% of the full-scale load. |
| Break Sensitivity | 40% |

Of the sixty-four packages created for each example, thirty-two were immediately opened and samples were tested for tensile strength. As described above, each package contained one bundle of spunbond consisting of 100 individual sheets. Four spunbond sheets were randomly taken from the one hundred present in each bundle. Two of these sheets had 6"×4" rectangles cut such that the tensile properties would be measured in the machine direction (MD) of the nonwoven. The remaining two sheets were cut such that the tensile properties in the cross direction (CD) of the nonwoven would be tested. The reported averages for MD and CD tensile strength were therefore obtained by averaging sixty-four results (2 tests per package×32 packages per code). The averages from these first 32 samples that did not see radiation were reported as the initial (pre-radiation) tensile strength of the material.

After irradiation, the other 32 samples from each code were tested using the same sampling method above. The averages from these next 32 samples that did see radiation were reported as the tensile strength of the material after 50 kGy dosing (post-radiation).

The % tensile loss due to radiation exposure was then calculated using the following formula:

$$\% \text{ tensile loss} = \left(1 - \frac{\text{tensile strength post-radiation}}{\text{tensile strength pre-radiation}}\right) \times 100\%$$

Data Tables

TABLE I

Effects of Vacuum Level, Packaging OTR, and Radiation Stabilizers on Tensile Properties of Polypropylene Spunbond Exposed to Sterilizing Radiation ($\gamma_{dose}$ = 50 kGy)

| | Material | Vacuum (mbar) | Package OTR (cm³/100 in²/day) | MD Tensile (lbf) Initial | 50 kGy | % loss | CD Tensile (lbf) Initial | 50 kGy | % loss |
|---|---|---|---|---|---|---|---|---|---|
| Examples | | | | | | | | | |
| 1 | 1A | 10 | 0.2 | 20.13 | 17.66 | −12% | 11.89 | 10.17 | −14% |
| 2 | 1B | 10 | 0.2 | 20.01 | 17.94 | −10% | 11.27 | 9.91 | −12% |
| 3 | 2A | 10 | 0.2 | 17.44 | 16.14 | −7% | 11.82 | 10.40 | −12% |
| 4 | 2B | 10 | 0.2 | 18.07 | 17.26 | −4% | 10.57 | 9.47 | −10% |
| 5 | 1A | 10 | 2.3 | 20.13 | 16.99 | −16% | 11.89 | 9.89 | −17% |
| 6 | 1B | 10 | 2.3 | 20.01 | 17.47 | −13% | 11.27 | 9.55 | −15% |
| 7 | 2A | 10 | 2.3 | 17.44 | 15.48 | −11% | 11.82 | 10.11 | −14% |
| 8 | 2B | 10 | 2.3 | 18.07 | 16.46 | −9% | 10.57 | 9.02 | −15% |
| 9 | 1A | 100 | 0.2 | 20.13 | 16.98 | −16% | 11.89 | 9.56 | −20% |
| 10 | 2A | 100 | 0.2 | 17.44 | 15.51 | −11% | 11.82 | 10.09 | −15% |

TABLE I-continued

Effects of Vacuum Level, Packaging OTR, and Radiation Stabilizers on Tensile Properties
of Polypropylene Spunbond Exposed to Sterilizing Radiation ($\gamma_{dose}$ = 50 kGy)

| | Material | Vacuum (mbar) | Package OTR ($cm^3$/100 $in^2$/day) | MD Tensile (lbf) | | | CD Tensile (lbf) | | |
|---|---|---|---|---|---|---|---|---|---|
| | | | | Initial | 50 kGy | % loss | Initial | 50 kGy | % loss |
| Comparative Examples | | | | | | | | | |
| C1 | 1A | 600 | 0.2 | 20.13 | 14.61 | −27% | 11.89 | 7.92 | −33% |
| C3 | 2A | 600 | 0.2 | 17.44 | 13.16 | −25% | 11.82 | 7.99 | −32% |
| C4 | 2B | 10 | >75** | 18.07 | 14.40 | −20% | 10.57 | 8.00 | −24% |

NOTE:
Reported tensile properties are peak load and represent an average of 64 samples.
Standard deviations for the data ranged from 3% to 10% of the reported average.

Table I shows the effects of varying the vacuum level, the oxygen transmission rate of the packaging material, and the use of radiation stabilizers on the tensile strength of polypropylene spunbond materials that have been exposed to gamma radiation ($\gamma_{dose}$=50 kGy). The data indicates that for a given radiation dose, the amount of damage done to the fabric is dependent on all three variables for the selected nonwoven material.

The spunbond materials in examples 1-4 are identical to the materials in examples 5-8. Likewise, the remaining pressure left in the packaging prior to sealing was also the same for both sets of examples (10 mbar). The only difference was the layer used in packaging the materials. Comparing example 1 to 5, 2 to 6, 3 to 7, and 4 to 8, clearly shows the spunbond material that was packaged with the lower OTR layer suffered less loss in tensile strength when exposed to radiation. The amount of loss, however, is still relatively low for both sets of examples.

Comparative example C4 demonstrates the amount of tensile loss that can occur if a packaging layer with a low OTR is not properly selected in line with the invention. Despite pulling a good vacuum and starting with the same spunbond material, the tensile loss of the spunbond in C4 is approximately twice as large as the tensile loss measured in examples 4 and 8. This set of data demonstrates that proper selection of packaging film with a low OTR is important to preserving the properties of polypropylene nonwovens when exposed to radiation.

The spunbond materials in examples 1 & 3 are identical to the materials in examples 9 & 10. Likewise, the packaging material is the same in both sets of examples. The only difference was the amount of vacuum pulled prior to sealing the samples. Comparing example 1 to 9 and 3 to 10, clearly shows the spunbond material that was packaged with the higher remaining pressure (100 mbar) suffered greater tensile loss when exposed to radiation. The amount of loss, however, is still relatively low for both sets of examples.

Comparative examples C1 and C3 demonstrate the amount of tensile loss that can occur if the level of vacuum is not properly selected in line with the invention. Despite using a low OTR packaging layer and starting with the same spunbond material, the tensile loss of the spunbond in C1 is approximately twice as large as the tensile loss measured in example 1 and 50% greater than the loss measured in example 9. Similarly, the tensile loss of C3 is approximately twice as large as the tensile loss measured in example 3 and 50% greater than the loss measured in example 10. This set of data demonstrates that proper selection of the vacuum level during packaging is important to preserving the properties of polypropylene nonwovens when exposed to radiation.

Finally, the tensile data demonstrates that the radiation stabilizers act synergistically with the vacuum and low OTR packaging layer. First, a comparison of comparative example C1 with C3 suggests that when a vacuum level outside the range of the invention is applied, the presence of the hindered amine stabilizers in the polypropylene spunbond provide little or no benefit to the amount of tensile loss observed after irradiation.

Surprisingly, however, when the hindered amines are used in conjunction with vacuum and low OTR packaging materials, there is a statistically significant impact on the MD tensile loss measured. This improvement in MD tensile with the use of the hindered amines can be observed by comparing examples 1 & 3, 2 & 4, 5 & 7, 6 & 8, and 9 & 10. In each of these comparisons, the amount of MD tensile strength is improved by approximately 4% to 6% when the hindered amines are present in the polypropylene. This corresponds to approximately a 33 to 50% reduction in tensile loss post-radiation.

TABLE II

Effect of Radiation Method on Tensile Properties of Polypropylene Spunbond ($\gamma_{dose}$ = 50 kGy)

| Examples | Material | Vacuum (mbar) | Package OTR ($cm^3$/100 $in^2$/day) | MD Tensile (lbf) | | | CD Tensile (lbf) | | |
|---|---|---|---|---|---|---|---|---|---|
| | | | | Initial | 50 kGy | % loss | Initial | 50 kGy | % loss |
| 11 (g) | 2B | 10 | 0.2 | 18.07 | 17.26 | −4% | 10.57 | 9.47 | −10% |
| 11 (e) | 2B | 10 | 0.2 | 18.07 | 16.94 | −6% | 10.57 | 9.62 | −9% |
| 12 (g) | 2B | 10 | 2.3 | 18.07 | 16.46 | −9% | 10.57 | 9.02 | −15% |
| 12 (e) | 2B | 10 | 2.3 | 18.07 | 16.60 | −8% | 10.57 | 9.05 | −14% |

NOTE:
Reported tensile properties are peak load and represent an average of 64 independent samples.
Standard deviations for the data ranged from 3% to 10% of the reported average.
(g)—Dosed with 50 kGy of gamma radiation
(e)—Dosed with 50 kGy of electron beam radiation Table II shows the effects of varying the source of the radiation. In this case the same fabric material is either exposed to a gamma radiation source or an electron beam source such that the same dose of radiation is imparted to the sample ($\gamma_{dose}$=50 kGy). The data indicates that for a given radiation dose, the resulting loss in tensile properties is similar. This is surprising in light of several articles that suggest electron beam radiation should impart less damage to sensitive materials than gamma radiation.

Turning to FIG. 1, package 10 may be used for packaging individual or multiple products such as, by way of example only, surgical or other type gowns, gloves, masks, drapes, packs, covers, and the like. Package 10 comprises outer members 12, 14 which are oxygen impermeable and sealed, for example, by means of heat seal lines 16,18, and 20, thereby forming interior 22 in package 10. Members 12, 14 can be a single layer of material, or a laminate of more than one layer of the same or different material, and in either case will include an EVOH layer for purposes of oxygen impermeability. Product 24, which is preferably a nonwoven polypropylene material, is placed in interior 22, and then package 10 is sealed along periphery 28. If desired, notches 26 may be cut in package 10 to facilitate product removal.

While this invention has been described as having a preferred embodiment, it will be understood that it is capable of further modifications. It is therefore intended to cover any variations, equivalents, uses, or adaptations of the invention following the general principles thereof, and including such departures from the present invention as come or may come within known or customary practice in the art to which this invention pertains and fall within the limits of the appended claims.

What is claimed is:

1. A method of sterilizing a product in a package to reduce tensile strength loss of the product after sterilization by radiation, comprising the steps of providing a package comprising a layer having an oxygen transmission rate equal to or less than about 0.2 cubic centimeter of oxygen per 100 inches squared per 24 hours, and having an interior, placing a product in the interior of the package, creating a vacuum in the package containing the product to a pressure equal to or less than about 100 millibars, thereby forming a vacuum packaged product, and sterilizing the vacuum packaged product with radiation, thereby forming a sterilized package containing the product, wherein the product, when removed from the sterilized package, has a reduction in its tensile strength less than about 20% where the reduction in tensile strength is measured by the following equation:

$$\% \text{ tensile strength loss} = \left(1 - \frac{\text{tensile strength post radiation}}{\text{tensile strength pre radiation}}\right) \times 100\%.$$

2. The method according to claim 1, wherein the vacuum created in the vacuum packaged product is to a pressure of equal to or less than 10 millibars, wherein the product, when removed from the sterilized package has a reduction in its tensile strength less than about 14%.

3. The method according to claim 2, wherein the radiation is gamma radiation.

4. The method according to claim 2, wherein the layer comprises ethylene vinyl alcohol.

5. The method according to claim 2, wherein the layer comprises a polyolefin material.

6. The method according to claim 5, wherein the polyolefin material is a nonwoven polypropylene material.

7. The method according to claim 1, wherein the radiation is gamma radiation.

8. The method according to claim 1, wherein the layer comprises ethylene vinyl alcohol.

9. The method according to claim 1, wherein the layer comprises a polyolefin material.

10. The method according to claim 9, wherein the polyolefin material is a nonwoven polypropylene material.

11. A method of sterilizing a product in a package to reduce tensile strength loss of the product after sterilization by radiation, comprising the steps of providing a package comprising a layer having an oxygen transmission rate equal to or less than about 2.3 cubic centimeter of oxygen per 100 inches squared per 24 hours, and having an interior, placing a product in the interior of the package, creating a vacuum in the package containing the product to a pressure equal to or less than about 10 millibars, thereby forming a vacuum packaged product, and sterilizing the vacuum packaged product with radiation, thereby forming a sterilized package containing the product, wherein the product, when removed from the sterilized package, has a reduction in its tensile strength less than about 17% where the reduction in tensile strength is measured by the following equation:

$$\% \text{ tensile strength loss} = \left(1 - \frac{\text{tensile strength post radiation}}{\text{tensile strength pre radiation}}\right) \times 100\%.$$

12. The method according to claim 11, wherein the radiation is gamma radiation.

13. The method according to claim 11, wherein the layer comprises ethylene vinyl alcohol.

14. The method according to claim 11, wherein the layer comprises a polyolefin material.

15. The method according to claim 14, wherein the polyolefin material is a nonwoven polypropylene material.

* * * * *

UNITED STATES PATENT AND TRADEMARK OFFICE
CERTIFICATE OF CORRECTION

| | | |
|---|---|---|
| PATENT NO. | : 8,323,562 B2 | Page 1 of 1 |
| APPLICATION NO. | : 13/239522 | |
| DATED | : December 4, 2012 | |
| INVENTOR(S) | : Phillip Andrew Schorr et al. | |

It is certified that error appears in the above-identified patent and that said Letters Patent is hereby corrected as shown below:

TITLE PAGE: ITEM 75 should read

Phillip Andrew Schorr, Atlanta, GA (US); Aaron Drake Smith, Roswell, GA (US); Sean Gorman, Cumming, GA (US); Stephanie A. Drilling, Atlanta, GA (US)

Signed and Sealed this
Seventeenth Day of March, 2015

Michelle K. Lee
*Director of the United States Patent and Trademark Office*